(No Model.)
J. SHORT.
SURVEYING INSTRUMENT.
No. 593,784. Patented Nov. 16, 1897.
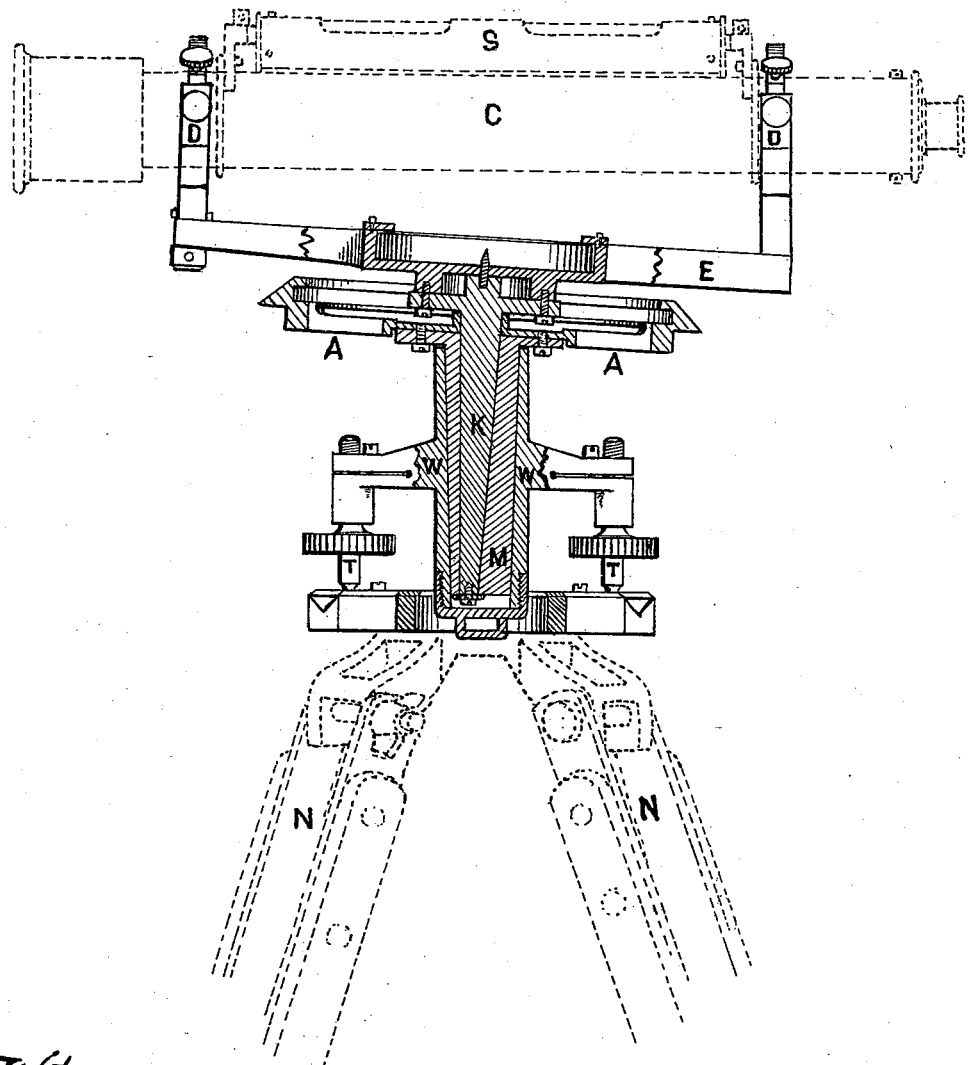
Witnesses
John Wyatt
William G. Eyles
Inventor.
John Short

UNITED STATES PATENT OFFICE.

JOHN SHORT, OF LONDON, ENGLAND.

SURVEYING INSTRUMENT.

SPECIFICATION forming part of Letters Patent No. 593,784, dated November 16, 1897.

Application filed May 11, 1896. Serial No. 591,113. (No model.) Patented in England July 29, 1889, No. 11,996.

*To all whom it may concern:*

Be it known that I, JOHN SHORT, a subject of the Queen of Great Britain, residing at 2 Gladstone Street, Southwark, London, in the county of Surrey, England, have invented a new and useful Surveying Instrument, (for which I have obtained a patent in Great Britain, No. 11,996, bearing date July 29, 1889,) of which the following is a specification.

My invention relates to a new level or surveying instrument which has for its object the accurate measurement of linear distances, gradients, and difference in level of objects, which it does by one and the same observation, and does away with the necessity for using the land chain or tape. It performs these operations with accuracy and ease to the observer, enabling a greater quantity of work being done in the same space of time compared with the usual methods employed by surveyors. The linear distances are obtained more accurately than with the chain and regardless of rough or broken ground or the existence of a stream or other water between the observer's station and the distant object.

In the drawing, A A is the circle or plate of metal with a chamfered edge, on which the graduations are engraved that show the gradients or inclination of the telescope to the objects viewed when the instrument is being used. This circle is attached to the outer axis M and revolves when the axis M is rotated in the lower frame of the instrument W W. This lower frame W W is technically termed a "tripod" or "tribrach." The inner axis K, which is mounted eccentrically to the outer axis M, has attached to it the stage or bar of metal E. On this stage E are fixed by screws the two Y-shaped supports D D, in which rests the telescope C. On the inner axis K being rotated the stage E and supports D D, together with telescope C, necessarily rotate also.

The outer axis M can be rotated in the frame W W independently of any movement of the inner axis K. The gradient or inclination of the telescope to the objects viewed results from the relative movement of the two axes M and K.

There is an index or sight member attached to the stage or bar of metal E, which indicates on the scale engraved on the circle A the amount of the relative movement of the axis K to the outer axis M for the purpose of measuring gradients or distances.

S is a spirit-level fixed to the top of the telescope C, by which means the instrument is set up truly level, so that on the outer axis M alone being rotated the line of sight of the telescope sweeps out a truly horizontal plane.

T T are two of the three leveling-screws, which work in the frame or tribrach W W. By means of these leveling-screws the instrument is set up truly level, as described.

N N are the wood legs, which form the stand of the instrument. The lower ends of these legs rest on the ground and the metal plate or head of this wood stand forms the base on which the leveling-screws T T work for setting up the instrument in a truly level position, as described.

The special construction of the instrument, as noted above, consists in the inner axis K and the outer axis M, standing eccentrically one to the other, in place of being concentric with each other, as is usual in the construction of theodolites, levels, and similar surveying instruments. This is shown in the figure, which gives in section the fitting of the two centers K and M, one within the other. Of these two axes the outer axis M has fixed to it the graduated limb A and the inner axis K has fixed to it the stage or platform E, and consequently the index and the whole of the upper part of the instrument, including the telescope and all its fittings. There is a clamp for fixing these two axes together, so that motion is got only by the outer axis M.

The instrument having been set upon its tripod-stand and leveled up by means of the screws T T T and the spirit-level S, as described above, it is apparent that on the instrument being rotated on the outer axis M, the index having first been fixed at zero on the graduated limb A, the telescope or line of sight will sweep out a truly horizontal plane, and it is equally apparent that on the instrument being rotated on the inner axis K the telescope or line of sight will sweep out a plane which stands at a corresponding angle to the horizontal as the two axes stand one to each other, these axes K and M not being concentric, but eccentric one with the other, as above described.

When the gradient is required between two stations, the instrument is set up at one and a leveling-staff is sent out to the other station. A tape-measure is then suspended from the base of the instrument and the height of center of telescope from the ground is read at the tape. The reading on the leveling-staff at the distant station is then taken. If this reading is the same as the reading of the suspended tape on the instrument, the two stations are level one with the other. If the reading on the staff differs from that on the tape, loosen the clamp-screw which holds the two axes together, and keeping the telescope directed to the staff with one hand, with the other move the graduated limb A until the telescope becomes depressed and reads on the staff the same height which the reading of the suspended tape below the instrument has. On reference to the index the gradient between the two stations—say one in one hundred and sixty—will be pointed out on the graduated limb A. This result will be obtained through the inner and outer axes of the instrument being eccentric one with the other, as explained above. This is the governing idea of the instrument and gives all the special results of its working.

If the distant station is higher than that of the instrument, the telescope C is reversed in the Y-supports D D, and the telescope, instead of being depressed, will become elevated on the axis M being rotated, in a like manner giving the gradient of the distant station. A similar method is used when getting distances. The leveling-staff at the distant station is read while the index stands at zero. Suppose this reading to be "10 feet 68 decimal." The clamp is then loosened and the index is moved to the gradient-mark "100" on the limb A and the leveling-staff is again read. Assume the reading then to be "6 feet 42 decimal." There are then two readings. First reading, "10.68;" second reading, "6.42;" difference, "4.26." The decimal-point is then struck out of the difference, and the figures as they stand give the distance four hundred and twenty-six feet between the two stations. The English foot-staff divided into one one-hundreth of a foot is used, or the French metric-staff.

N N N in the drawing is the tripod-stand of the instrument, formed of three mahogany legs. The suspended tape hangs from the base-plate of the instrument. It passes through a square loop there, and the tape is read, as explained above, at this square metal loop.

The base-plate of the instrument W W W W is a hollow cylinder in which the axis M is fitted and in which it rotates. It has three arms, in the ends of which one of the three leveling-screws T T T work, so that by the raising or lowering of these three screws the instrument is truly leveled up through the indications got from the spirit-level S, as explained above.

It will be seen from the preceding details that the whole idea of the instrument lies in gaining two different planes for the sweeping or working of the telescope—one a truly horizontal plane when rotated on the outer axis M and the other an inclined plane to the horizontal when rotated on the inner axis K.

The difference in height or rise and fall—i. e., in gradient—of different objects as viewed through the telescope is expressed in the gradient-value "1 in 100," "1 in 50," "1 in 20," &c., on the graduated limb which is attached to the outer axis M, as beforesaid.

Having thus described my invention, what I claim as new, and desire to secure by Letters Patent, is as follows:

1. The combination in a surveying instrument of two axes, one of which is mounted eccentrically to the other, whereby gradients and distances may be measured by the relative movement of the axes.

2. The combination in a surveying instrument of two axes, one of which is mounted eccentrically to the other, a sight member and a scale to indicate the relative movement of the axis for the purpose of measuring gradients and distances.

JOHN SHORT.

Witnesses:
 JOHN WYATT,
 GEORGE EYLES.